United States Patent [19]

Banoczky

[11] Patent Number: 4,730,958
[45] Date of Patent: Mar. 15, 1988

[54] OVERHEAD CAMBEARING LINE BORING TOOL

[76] Inventor: Bela Banoczky, 1460 Livorna Rd., Alamo, Calif. 94507

[21] Appl. No.: 787,670

[22] Filed: Oct. 15, 1985

[51] Int. Cl.⁴ .............................................. B23B 41/12
[52] U.S. Cl. ...................................... 408/54; 408/75; 408/116; 408/708
[58] Field of Search .............. 408/705, 707, 708, 714, 408/713, 36, 72 B, 115 B, 241 B, 147, 148, 150, 143, 54, 75, 116; 409/143; 82/1.2

[56] References Cited

U.S. PATENT DOCUMENTS

| 1,094,187 | 4/1914 | Austin | 408/708 |
|---|---|---|---|
| 1,434,004 | 10/1922 | Greven | 408/708 |
| 1,585,026 | 5/1926 | Green | 408/708 |
| 1,752,066 | 3/1930 | Cox | 408/708 |
| 1,836,078 | 12/1931 | Litter | 408/708 |
| 1,885,773 | 11/1932 | Shoemaker | 408/708 |
| 1,939,786 | 12/1933 | Mooers | 408/708 |
| 2,066,389 | 1/1937 | Blazek et al. | 408/116 |
| 2,108,821 | 2/1938 | Johnson | 408/708 |
| 2,160,476 | 5/1939 | Kammeier | 408/708 |
| 2,170,054 | 8/1939 | Jeschor | 408/708 |
| 2,204,855 | 6/1940 | Healy | 408/116 |
| 2,204,860 | 6/1940 | Johnson | 408/708 |
| 2,250,788 | 7/1941 | Arp | 408/708 |
| 2,604,284 | 7/1952 | Arp | 408/708 |
| 2,627,193 | 2/1953 | Statia, Sr. | 408/116 X |
| 2,651,221 | 9/1953 | Foster | 408/708 |
| 3,345,888 | 10/1967 | Gustkey | 408/714 |
| 4,213,721 | 7/1980 | Aldridge, Jr. | 408/708 |
| 4,451,186 | 5/1984 | Payne | 408/708 |

FOREIGN PATENT DOCUMENTS 2431339  3/1980  France ............................ 408/143

Primary Examiner—Z. R. Bilinsky
Attorney, Agent, or Firm—James R. Cypher

[57] ABSTRACT

A portable cambearing line boring tool for an internal combustion engine with an aluminum head or a cast iron block with aluminum caps and an overhead camshaft with non-replaceable bearings that are cast in as an integral part of the cylinder head which utilizes a cutting bar formed with blind openings for receiving spring loaded cutters. Centering of the cutting bar is by the use of locating bushings selected to fit a plurality of different cam-oil-seal and/or oil-plug openings at either end of the cylinder head. The bushings remain in place during the line boring. Horizontal alignment is by alignment ears secured to the upper valve cover gasket surface. For long heads a center bar support is provided. Rotation of the bar is by a portable hand held drill.

4 Claims, 11 Drawing Figures

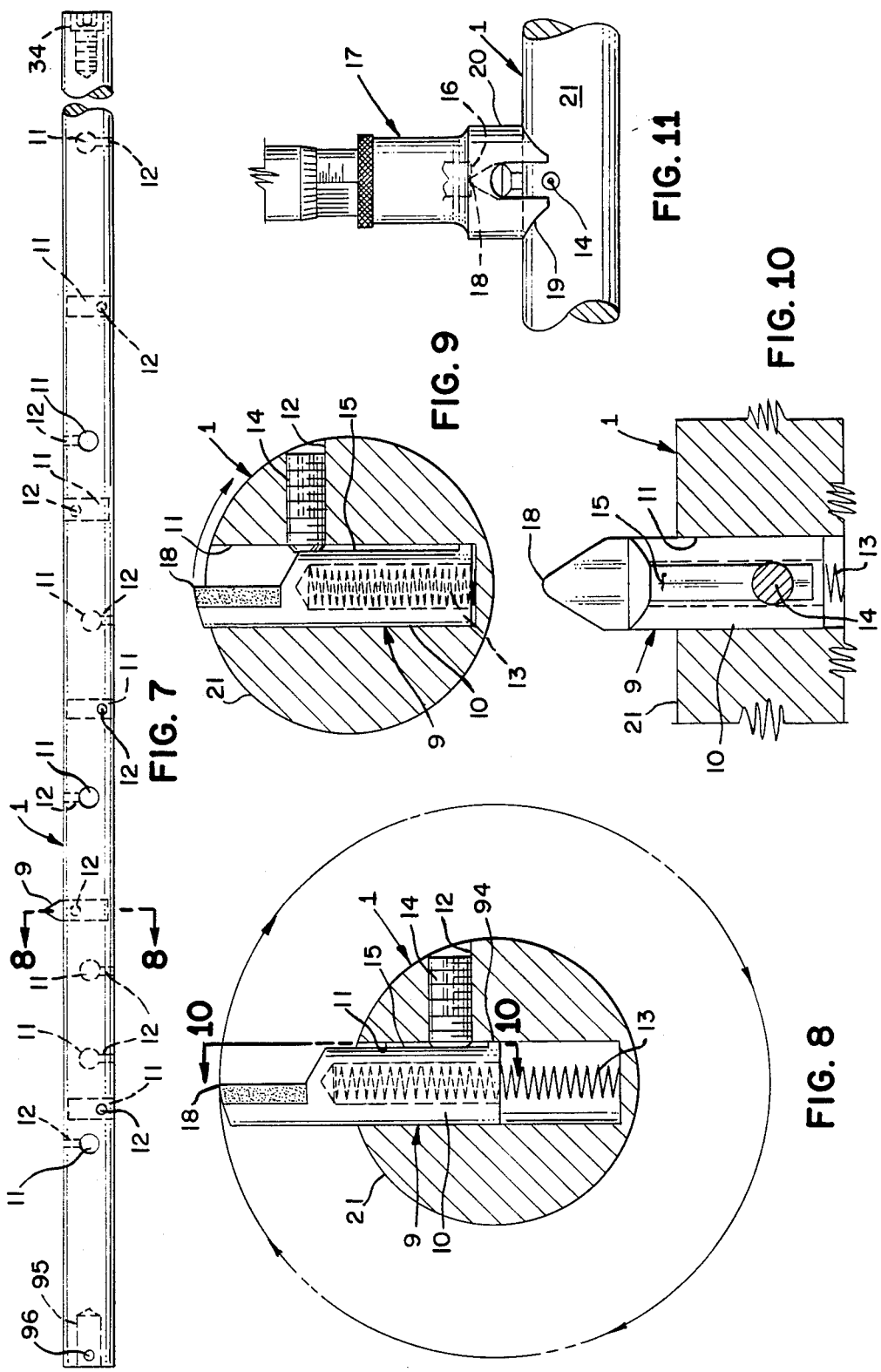

OVERHEAD CAMBEARING LINE BORING TOOL

BACKGROUND OF THE INVENTION

From the early beginnings of the automobile industry to the present, the most widely used engines use push rods which are actuated by a camshaft located in the engine block, adjacent and to the side of the crankshaft. Any scoring or damage to the camshaft bearings usually requires relacement of the bearings.

About 1968 a major change in engine design took place. The Triumph TR-7 and the Saab automobile introduced a cast iron block engine with an aluminum head and an overhead camshaft with non-replaceable bearings that are cast in as an integral part of the cylinder head. Scoring or damage to the cast-in camshaft bearings requires line boring of the bearing surface or replacement of the cylinder head. In 1975 VW, Audi and Porche adopted the overhead camshaft arrangement and later, several types of automobiles produced in Japan followed the overhead camshaft trend. Today, thousands of automobiles use the overhead cam engine design, and as the engines reach 80,000 to 90,000 miles in service, wear in the camshaft bearings reaches a point where reboring is required to give satisfactory engine reliability and performance. Present line boring tools are either too expensive, inadequate or take too much time to economically service these overhead cam engines.

SUMMARY OF THE INVENTION

The cambearing line boring tool of the present invention is portable and inexpensive so that such work need not be confined to large main automobile agencies or motor engineering specialists. All but the smallest agencies and shops will be able to afford the tool of the present invention, and even then, every skilled mechanic will be able to use the tool with only the briefest of instruction.

While cutting bars have been used since the earliest days of line boring tools, the present invention utilizes a blind hole and spring loaded cutting member which speeds set up time and insures cutting accuracy never before achieved is such a tool.

The main feature of the present invention which permits the cutting bar to be quickly and accurately centered is the use of locating bushings which are designed to fit in the cam-oil-seal and/or oil-plug at either end of the cylinder head. Moreover, unlike previous tools which used locating bushings in one of the bearings to be rebored, the locator bushings of the present invention need not be removed during the reboring operation. The present tool also provides locator bushings of different outside diameters so that nearly all overhead camshaft engines can be serviced.

The present invention provides alignment ears which provide horizontal alignment of the cutter bar. While similar alignment devices have been used in the past, none have been connected to the upper valve cover gasket surface of the engine head having overhead camshafts.

This application disclosed a center support for a cutting bar which has a quick set up feature never used in line boring tools. The centering device is only required where the distance between bearings exceeds certain limits to give superb line boring accuracy.

BRIEF DESCRIPTION OF THE DRAWINGS

FIG. 7 is a side view of the cutting bar with a section removed so that both end portions could be illustrated.

FIG. 8 is a enlarged cross sectional view taken along line 8—8 of FIG. 7.

FIG. 9 is a cross sectional view on an enlarged scale also taken along line 8—8 of FIG. 7 showing the cutting tool in a retracted position for boring a minimum bore.

FIG. 10 is a front elevational view of a portion of the cutting tool with a portion of the cutting bar in cross section as taken along line 10—10.

FIG. 11 is a side elevational view of a portion of the cutting bar with a portion of a micrometer shown to illustrate the method of setting the cutting tool.

DESCRIPTION OF THE PREFERRED EMBODIMENT OF THE INVENTION

Figure 1:
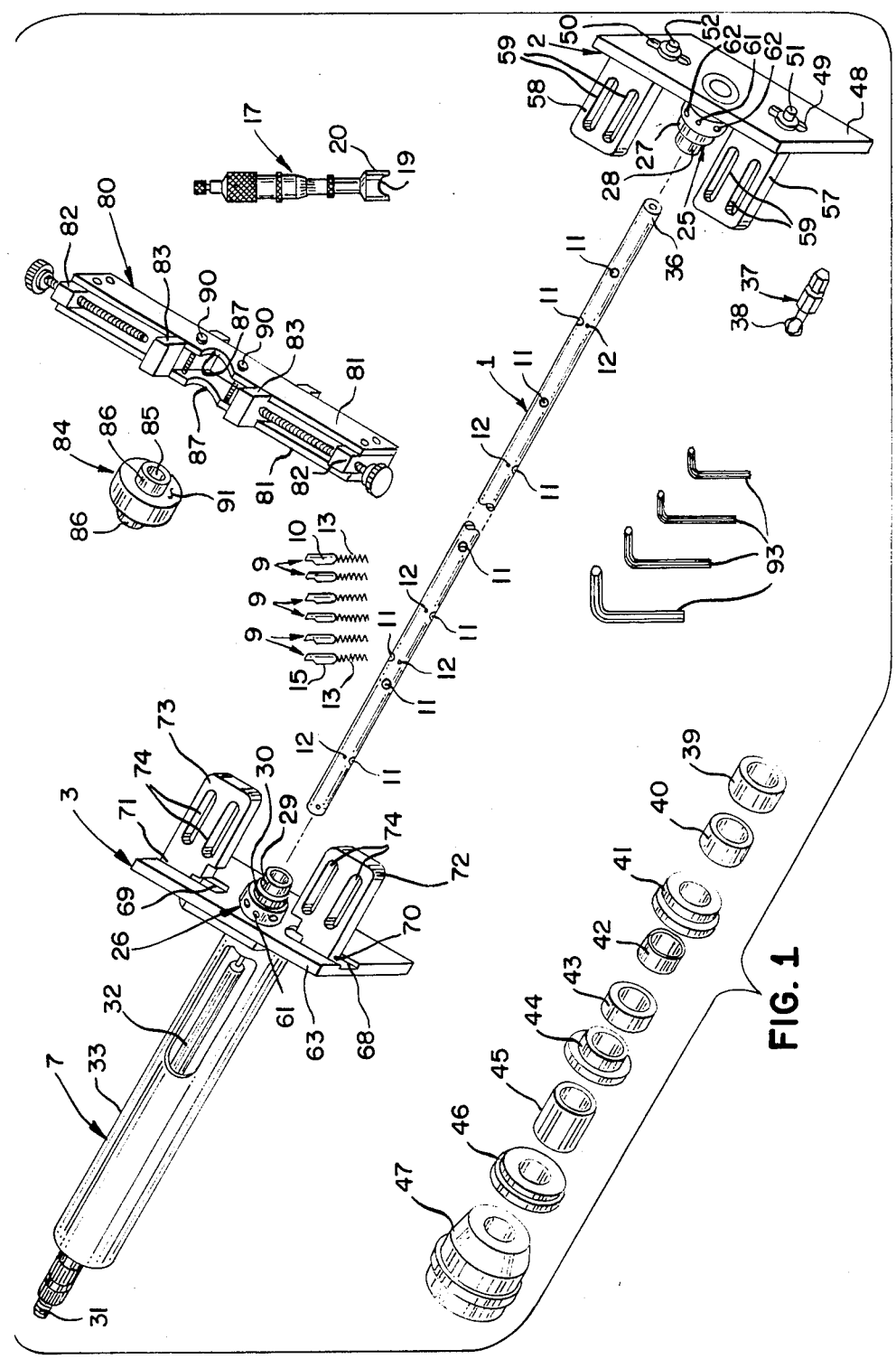
FIG. 1 is a perspective view of the overhead cambearing line boring tool of the present invention and a complete set of bushings and tools necessary for the operation of the tool.

The apparatus of the present invention consists of an enlongated cutting bar 1, mounting means 2 and 3 for mounting the bar rotatably in centered position with respect to a substantially aligned bearing 4 fixed in a machine frame 5, means 6 for rotating the bar, feed means 7 mounted on the machine frame and removably connected to the bar for advancing the bar longitudinally in the direction shown by arrow 8 upon rotation of the bar, and a cutting tool 9 formed with a shank 10. The cutting bar is formed with a blind opening 11 having a cross section dimensioned to removably receive the cutting tool shank. The cutting bar is formed with a threaded opening 12 angularly intersecting the cutting bar blind opening and spring means 13 is mounted in the blind opening and urges the cutting tool radially outwardly. Threaded set screw means 14 mounted in the threaded opening releasably engages and holds the cutting tool in a selected position radially of the cutting bar.

The use of cutting bars in line boring apparatus with cutting tools mounted therein is standard practice in the industry. It is standard practice to mount the shank of the cutting tool either in a blind hole as shown in Greven, U.S. Pat. No. 1,434,004 or a through hole as shown in Jeschor U.S. Pat. No. 2,170,054. In all instances, a set screw is used to hold the tool at the proper radial distance for cutting the bearing opening. Adjustment of the proper radial distance is a laborious time consuming job. This time consuming task is alleviated by the use of springs 13 urging the cutting tools out of the blind holes.

In the present apparatus setting the radial depth of the cutting tool is simply a matter of loosening the set screw 14, placing the cutting tool in blind hole 11 with the planar face 15 of the cutting tool facing the set screw, pressing the carbide face 16 of the micrometer 17 squarely on the tip 18 of the cutting bit and moving the micrometer toward the cutting bar against the biasing force of spring 13 until the curved face 19 of the adaptor 20 of the micrometer rests on the surface 21 of the cutting bar. The set screw 14 is tightened against the planar face of the shank of the cutting tool 9 and setting of the cutting tool is complete.

In practice, a plurality of cutting tools 9 are mounted on the cutting bar in the same manner disclosed above. The cutting tools should be mounted so all of the bearings can be bored at or about the same time to minimize the amount of travel of the cutting bar. The cutting tools are preferable mounted angularly to one another and a 180 degree angle has been found to reduce vibration of the cutting bar. It has been found that each cutting bar should be furnished with 12 mounting holes and 6 cutting bits.

The cambearing line boring tool of the present invention is specifically designed to be used on cylinder heads 5 that have cast-in overhead camshaft bearings 4. It is designed to rebore the camshaft bearing surfaces 22 to their original size and precision alignment. The flexibility of the tool design allows it to be used on a variety of cylinder head types and is designed to be easily moved between heads of the same type. It is also designed to be quickly reconfigured when moving from one model head to another. Cambearing line boring is recommended whenever a cylinder head has enough warp to require surfacing or whenever a bearing surface has to be filled or welded. Performing a standard valve job without resizing and realigning the camshaft surfaces may result in camshaft binding, bearing overheat, and possible engine failure. The head usually warps or bows up in the center and may also twist or torque. Severely warped heads, with a warp of over 0.017", will require staightening before they can be line bored. The tool illustrated and described is capable of boring diameters from 0.9687" up to 1.675" but other sizes may be bored with proper tool design.

The portable overhead cambearing line boring tool of the present invention is specifically for reboring the camshaft bearing surfaces in cylinder heads that have cast-in overhead camshaft bearings and cam-oil-seal and/or oil-plugs 23 and 24 at both ends of the cylinder head. The tool consists of a pair of end mounting means 2 and 3 adapted for releasably mounting on the ends of the cylinder head and each includes a bearing such as built-in stepped bearings 25 and 26 dimensioned for rotatably and slidably receiving the cutting bar in close fitting relation. The built-in stepped bearings have outside annular surfaces 27, 28, 29 and 30 which are dimensioned for close machine fit with one of the end cam-oil-seal and/or oil plugs formed in the cylinder head ends.

A feed means 7 mounted on end mounting means 3 is removably connected to the bar for advancing the bar longitudinally upon rotation of the bar. The feed unit pulls the cutting bar away from the drive end and toward the feed end. The feed unit may be an off the shelf item such as a common lathe feed. Essentially, a portion 31 of the shaft 32 running through the feed housing 33 is threaded and is threadably connected to a knob or plate (not shown) which causes the shaft 32 to move longitudinally when rotated. A form of feed unit using this principle is illustrated in Green's U.S. Pat. No. 1,585,026. The shaft portion 31 is threaded so that a single rotation of the shaft advances the shaft and cutting bar 0.002".

Figure 2:
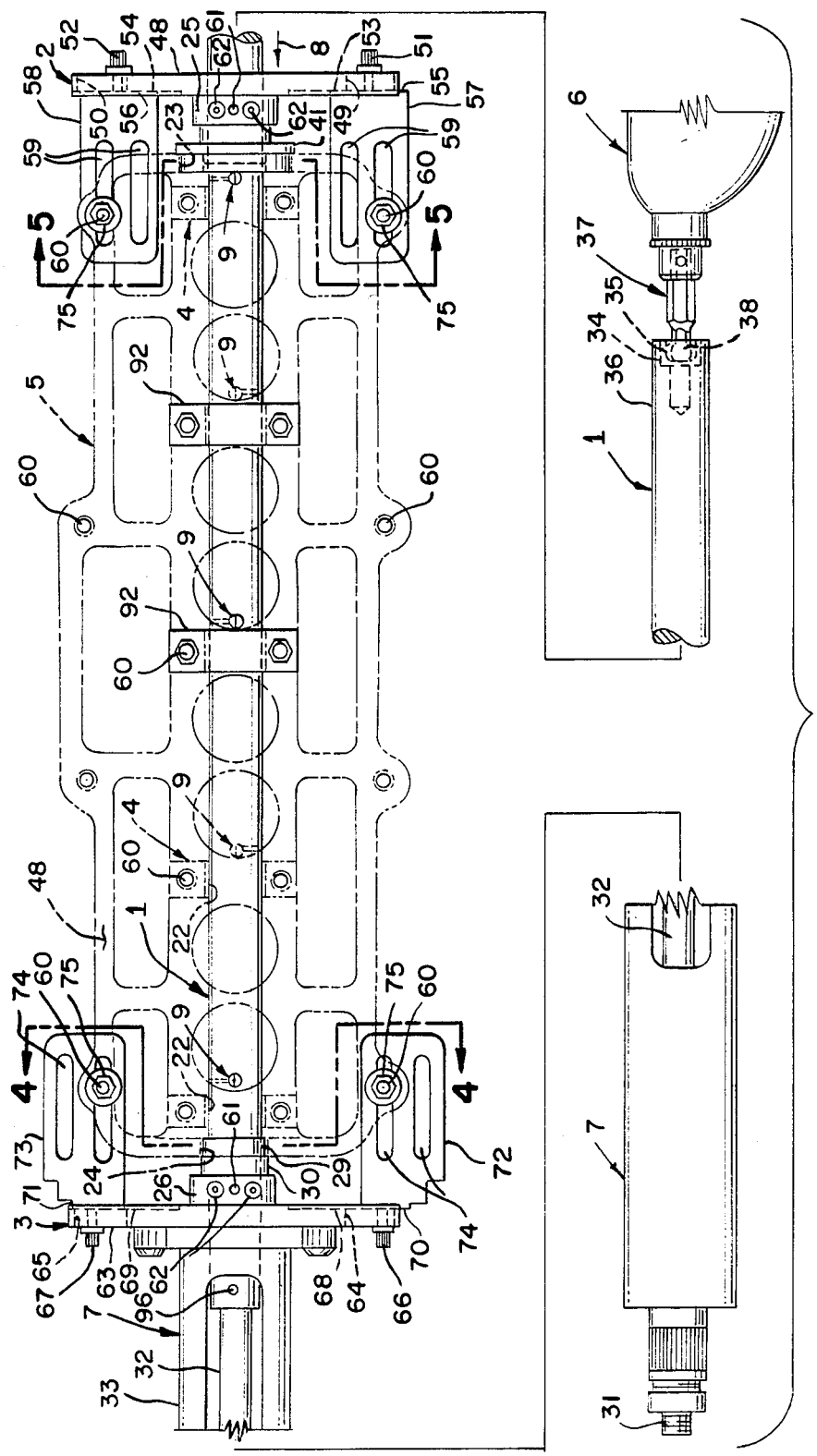
FIG. 2 is a top plan view of the tool illustrated in FIG. 1 positioned on an engine head which is shown in phantom line. Two bearing caps have been removed for purposes of clarity and two bearing caps are in position for boring. Both ends of the tool have been separated from the tool and are shown below the engine head for purposes of showing the entire tool on one sheet. A power drill used to turn the cutting bar is partially shown.

The cutting bar is preferable rotated by an electric hand drill 6 which is coupled to the drive end of the cutting bar. As shown in FIG. 2, a fitting 34 with a hex head configuration 35 is connected to the drive end 36 of the bar. A hex ball driver 37 shown in FIGS. 1 and 2 is provided which couples the drill and the head configuration in the cutting bar. The hex ball driver does not require alignment of the drill and cutting bar in order to operate due to the registration of the hex ball 38 on the hex ball driver 37 with the hex head configuration 35 in the fitting 34.

Since the cam-oil-seal and/or oil-plug at the ends of the cylinder head will vary in diamenter from engine to engine, a plurality of pairs of locator bushings as shown is FIG. 1 are provided with each portable kit. These bushings have inside diameters to either register with the cutting bar or the stepped bushings in the end mounting means. The bushings have outside diameters dimensioned to register with the half diameter of the cam-oil-seal wall and/or oil-plug 23 and 24 at the ends of the cylinder head.

As illustrated in FIG. 1, for example, bushing 39 is for a Dodge automobile head, bushing 40 is for a Nissan head, bushing 41 is for Audi, VW, Porche, Volvo heads, bushings 42 is for a Volvo head, bushing 43 is for a Toyota head, bushing 44 is for a Honda head, bushing 45 is for a Honda head, bushing 46 is for a Chrysler head and bushing 47 is for a Honda and Mitsubishi head.

Figure 3:
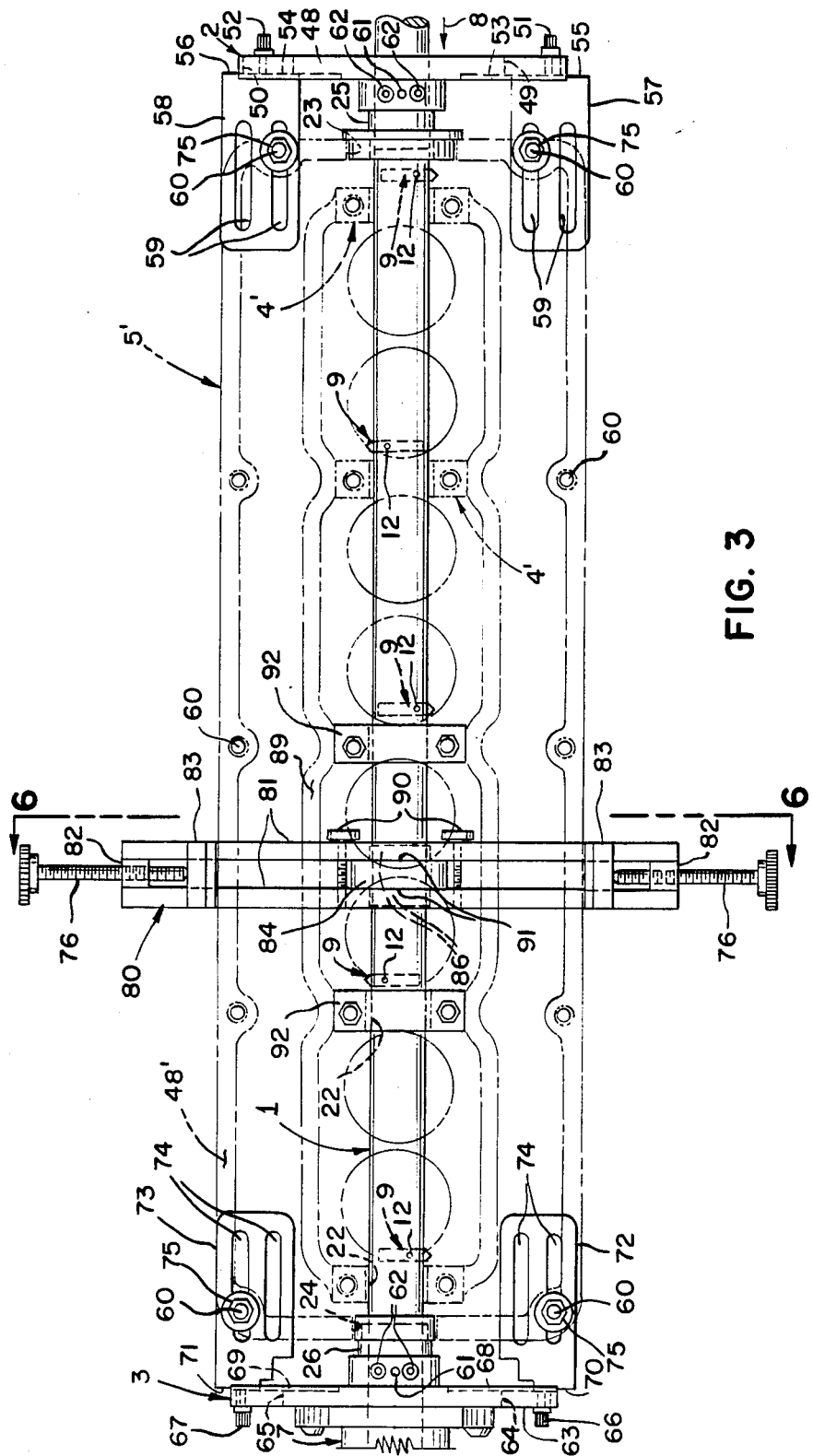
FIG. 3 is a top plan view of the tool illustrated in FIG. 1 mounted on a larger engine head such as that of a Volvo autombile which is shown in phantom line. A center support unit is mounted on the engine head.
Figure 4:
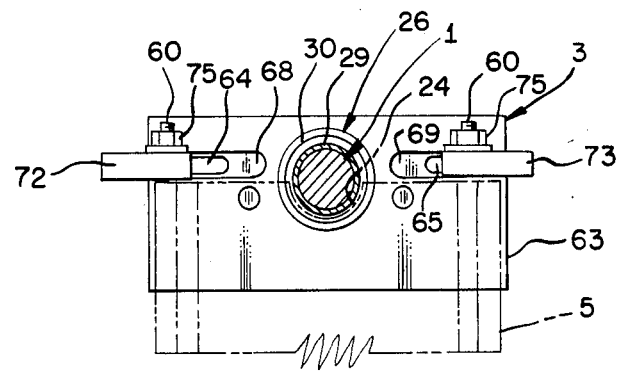
FIG. 4 is a cross sectional view taken along lines 4—4 of FIG. 2.
Figure 5:
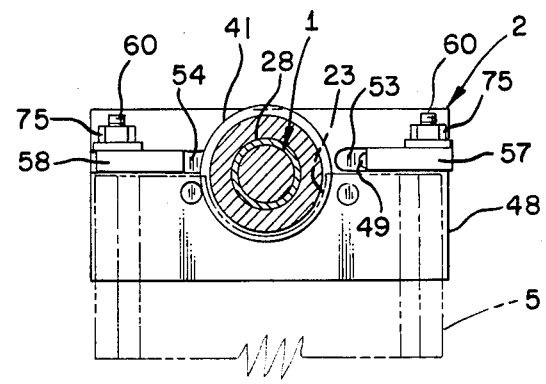
FIG. 5 is a cross sectional view taken along lines 5—5 of FIG. 2.
Figure 6:
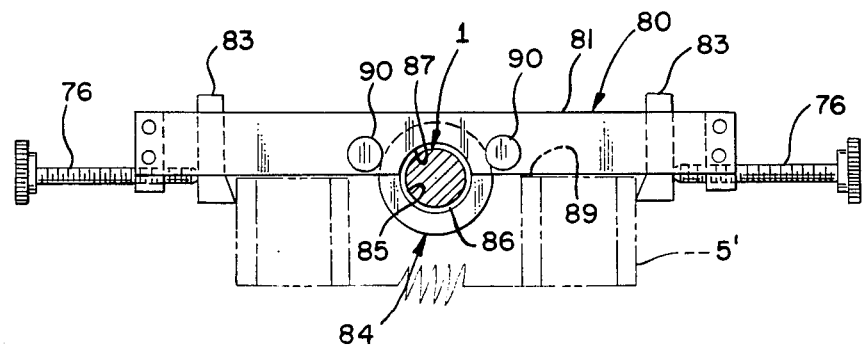
FIG. 6 is a side view of the center support unit with a portion of the engine head shown in cross section substantially along line 6—6.

Referring to FIGS. 1, 2 and 3, the end mounting means 2 and 3 are further described as follows. The mounting means are designed for fitting a plurality of automobile heads of several different makes. FIG. 2 illustrates a head 5 having a relative short length and narrow width such as a VW automobile. FIG. 3 illustrates a head 5' having a relatively long and wide head such as a Volvo. Each has an upper valve cover gasket surface 77 and 77'.

Drive end mounting means 2 includes a plate member 48 formed with slotted openings 49 and 50, for receiving threaded screws 51 and 52. Horizontal slots 53 and 54 receive projections 55 and 56 on alignment ears 57 and 58. The alignment ears are formed with slots 59 which slidably receive valve cover studs 60 in the engine head. Threaded nuts 75 firmly attach the alignment ears to the engine head valve cover studs. The under surface of the alignment ears have a planar surface for close fitting relationship and face to face contact with the upper valve cover gasket surface. An oil hole 61 to lubricate the cutting bar, and nylon set screws 62 to compensate for bushing wear and prevent chattering are provided in the alignment plate stepped locating bushing 25.

The feed end mounting means 3 includes a plate member 63 formed with slotted openings 64 and 65 for receiving threaded screws 66 and 67. Horizontal slots 68 and 69 receive projections 70 and 71 on alignment ears 72 and 73. The alignment ears are formed with slots 74 which slidable receive valve cover studs 60 in the engine head. Threaded nuts 75 firmly attach the alignment ears to the engine head valve cover studs. The under surface and the upper surface of the alignment ears have a planar surface for close fitting relationship and face to face contact with the upper valve cover gasket surface. Note that the alignment ears may be turned over about the eccentric threaded screws 66 and 67 to fit the narrow block 5 or the wider block 5'. An oil hole 61 to lubricate the cutting bar, and nylon set screws 62 to compensate for bushing wear and prevent chattering are provided in the alignment plate stepped locating bushing 26.

Due to the flex of the cutting bar, an auxiliary support unit 80 must be used whenever the locating bushings are spaced over 17' apart. Referring to FIGS. 1 and 3, the auxiliary support unit includes a pair of laterally spaced beam members 81 joined at their ends by block member 82 which are dimensioned to span the width of the cylinder head. Clamping means 83 held by threaded screws 76 are slidably connected to the beam members for releasably clamping the auxiliary support unit to the sides of the cylinder head. Each of the beams are formed with a semi-circular opening 87 generally adapted for alignment with the cutting bar. A plastic bushing 84 formed from a plastic material to eliminate the induced vibration having an opening 85 is dimensioned for slidable receipt of the cutting bar and annular projections 86 are dimensioned for registration with the semi-circular openings 87 in the beam members 81. The bottoms of the beams are dimensioned for resting on the surface 89 of the head. Clamping screws 90 are threadably connected to the beam members 81 and serve to force the inside surfaces of the beam against side faces 91 of bushing 84.

In the tool of the present invention the maximum boring travel is 3.750 inches and using a drill which turns at 1800 RPM and a feed rate of 0.002" per revolution, maxiaum travel is 3.6" per minute. Thus when properly set up, the boring time is about 1 minute.

The entire kit including the plastic and metal case with full padding weighs about 21 pounds. The tool user should provide his own electric ⅜" hand drill motor with Jacobs Chuck. A nonreversible motor with Variable speed is recommended.

The set up procedure and operation of the tool is as follows. The bearing caps 92 are removed and the caps and bearings are prepared according to standard procedures for boring. The feed means 7 and plate member 63 are removed from the case (not shown) and checked to see if the stepped locating bushing 26 fits the cam-oil-seal and/or oil-plug at either end of the cylinder head. If the stepped locating bushings do not fit, then one of the locating bushings 39–47 is selected. Next, the end mounting means 2 is taken from the case and the stepped locating bushing 25 is checked as previously stated and a locator bushing 39–47 selected if necessary. The cutter bar is then placed through stepped bearing 25 in plate member 48 and carefully slid into the feed unit means through stepped bearing 26. The alignment ears should face each other as shown in FIGS. 2 and 3. The alignment ears should then be connected to the valve cover studs as previously described or with clamps or user supplied bolt nut and washer combinations.

The locations for the cutting bits are selected so that they will be as close to the bearing to be cut as possible so that all bearing surfaces may be cut at on time with a minmum of bar travel. The cutting bits should then be intalled using the proper allen wrench 93. FIG. 8 shows the cutting bar at nearly maximum boring diameter.

Note that the shoulder 94 prevents the set screw 14 from slipping off the planar face 15 of the shank 10. FIG. 9 shows the minimum boring diameter with the set screw 14 engaging the very end of the planar face 15. The cutting members usually can be retracted and left in place even though they will not be used in boring a particular line of cam bearings.

Where the auxiliary support is needed, it should be inserted prior to drilling as set forth above.

The cutting bar 1 is connected to feed shaft 32 by inserting the reduced diameter end of the feed shaft into longitudinal opening 95 in the cutting bar and tightening set screw 96. The drill 6 is connected to the end 36 of the cutting bar as previously described and the boring takes place. When the boring operation is completed, the cam bearing caps should be removed and the work inspected.

I claim:

1. A portable overhead cambearing line boring tool for reboring the camshaft bearing surfaces in cylinder heads that have cast-in overhead camshaft bearings and cam-oil-seal and/or oil-plugs at both ends of said cylinder head comprising:
   a. an elongated cutting bar formed with a plurality of longitudinally spaced cutting tool bores transverse to the longitudinal axis of said elongated cutting bar and a plurality of threaded bores angular intersecting each of said cutting tool bores;
   b. a plurality of cutting tools respectively removably mounted in each of said cutting tool bores;
   c. set screw means mounted in each of said threaded bore and releasably holding said cutting tools in seleced positions radial to said cutting bar;
   d. a pair of end mounting means adapted for releasably mounting on said ends of said cylinder head and each end mounting means including a locator built-in-bushing having an internal opening dimensioned for rotatably and slidably receiving said cutting bar in close fitting relation and each locator built-in bushing having an outside cylindrical surface adapted for close machine fit with one of said end cam-oil-seal and/or oil-plugs formed in said cylinder head ends for precisely aligning said cutting bar;
   e. feed means mounted on one of said pairs of end mounting means and removably connected to said bar for advancing said bar longitudinally with respect to said cylinder head upon rotation of said bar; and
   f. means releasably connected to said bar for rotating said bar.

2. A tool as described in claim 1 comprising:
a plurality of auxilliary pairs of locator bushings each having an inside opening dimensioned for close fitting registration with said outside cylindrical surface of said locator built-in bushing and outside cylindrical surfaces dimensioned to selectively closely fit said cam-oil-seal and/or oil-plug openings in a plurality of cylinder heads having cam-oil-seal and/or oil-plug openings of different dimensions.

3. A tool as described in claim 1 wherein said cylinder head is formed with an upper valve cover gasket surface and formed with valve cover studs and wherein:
   a. said pair of end mounting means each include alignment ears formed with slotted openings adapted for registration and connection to said valve cover studs, and said alignment ears are formed with a planar surface adapted for face to face contact with said upper valve cover gasket surface.

4. A tool as described in claim 1 comprising:
a. an auxiliary support member including a pair of laterally spaced beam members spanning said cylinder head, clamping means slidably connected to said beam members for releasably clamping to said cylinder head and to said beam members, a bushing having an opening dimensioned to slidably mount in close fitting relation on said cutting bar to support and permit rotation of said bar, and clamping means fixedly connecting said bushing to said beam members.

* * * * *

UNITED STATES PATENT AND TRADEMARK OFFICE
CERTIFICATE OF CORRECTION

PATENT NO. : 4,730,958

DATED : 3-15-88

INVENTOR(S) : Bela Banoczky

It is certified that error appears in the above-identified patent and that said Letters Patent is hereby corrected as shown below:

Column 3, line 46, change "staightening" to ---straightening---

Column 5, line 13, change "17'" to ---17"---

Column 5, line 36, change "maxiaum" to ---maximum---

Column 5, line 65, change "on" to ---one---

Signed and Sealed this

Nineteenth Day of July, 1988

*Attest:*

DONALD J. QUIGG

*Attesting Officer*   *Commissioner of Patents and Trademarks*